(12) United States Patent  
Davis et al.

(10) Patent No.: US 8,131,986 B2  
(45) Date of Patent: Mar. 6, 2012

(54) SYSTEM AND METHOD FOR BOOT LOADING OF PROGRAMS WITHIN A HOST OPERATING ENVIRONMENT HAVING ONE OR MORE LINKED GUEST OPERATING SYSTEMS

(75) Inventors: Mark C. Davis, Durham, NC (US); Scott E. Kelso, Durham, NC (US); Ling Ma, Cary, NC (US); Nathan J. Peterson, Raleigh, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1011 days.

(21) Appl. No.: 11/529,900

(22) Filed: Sep. 29, 2006

(65) Prior Publication Data

US 2008/0082811 A1 Apr. 3, 2008

(51) Int. Cl.
- *G06F 9/00* (2006.01)
- *G06F 9/24* (2006.01)
- *G06F 15/177* (2006.01)
- *G06F 9/455* (2006.01)
- *G06F 21/00* (2006.01)

(52) U.S. Cl. .......... 713/2; 713/1; 718/1; 711/6
(58) Field of Classification Search .......... 713/1, 2; 718/1; 711/6, 147, 153, 221
See application file for complete search history.

(56) References Cited

U.S. PATENT DOCUMENTS

| | | | |
|---|---|---|---|
| 6,393,560 B1 * | 5/2002 | Merrill et al. | 713/2 |
| 7,065,630 B1 * | 6/2006 | Ledebohm et al. | 711/206 |
| 7,281,124 B2 * | 10/2007 | Rothman et al. | 713/1 |
| 7,577,831 B2 * | 8/2009 | Pant et al. | 713/1 |
| 2004/0088692 A1 * | 5/2004 | Stutton et al. | 717/168 |
| 2004/0133591 A1 * | 7/2004 | Holenstein et al. | 707/102 |
| 2006/0155667 A1 * | 7/2006 | Tolba | 707/1 |
| 2006/0184349 A1 * | 8/2006 | Goud et al. | 703/24 |
| 2007/0233455 A1 * | 10/2007 | Zimmer et al. | 703/27 |
| 2009/0259836 A1 * | 10/2009 | Chan et al. | 713/2 |

OTHER PUBLICATIONS

Tom Yager, Xen 3.0 Make Paravirtulization Mainstream, Jul. 3, 2006, InfoWorld, http://www.infoworld.com/t/platforms/xen-30-makes-paravirtualization-mainstream-230.*

* cited by examiner

*Primary Examiner* — Kim Huynh  
*Assistant Examiner* — Brandon Kinsey  
(74) *Attorney, Agent, or Firm* — Sawyer Law Group, P.C.

(57) ABSTRACT

A system and method for loading programs during a system boot using stored configuration data in a predetermined file system from a prior session and providing the stored configuration data to a guest operating system capable of communication with a host operating system, during start-up, within a computing environment having a hypervisor, in a predetermined manner.

33 Claims, 5 Drawing Sheets

SYSTEM AND METHOD FOR BOOT LOADING OF PROGRAMS WITHIN A HOST OPERATING ENVIRONMENT HAVING ONE OR MORE LINKED GUEST OPERATING SYSTEMS

FIELD OF INVENTION

The present invention relates generally to loading programs during system boot from files resident in a host operating system, from a prior operation, into computer memory for use by one or more guest operating systems, for their initialization, which are in communication with the host operating environment.

BACKGROUND OF THE INVENTION

It is widely known that when a personal computer is turned on, the basic input-output system (BIOS) that is stored in the non-volatile solid state memory of the computer is invoked to begin what is known as a "boot" process. The process of booting includes the various instantiation or initialization of select start-up activities and processes. A typically important task occurring during the booting process is the copying of an operating system from disk storage of the computer into volatile solid state memory, such as DRAM, of the computer. Once copied, execution of the operating system by the processor of the computer is readily undertaken.

Similarly, when the computer is turned off or when it is undergoes "re-booting," the operating system is flushed from the volatile solid state memory. By executing the operating system from the relatively fast volatile memory instead of from the disk, computer operations are accelerated and consumers wait times are reduced.

It is also widely known that typically the BIOS code is independent of the specific operating system of a computer. For instance, conventionally, BIOS has been utilized in a single location, such as, e.g., cylinder 0, head 0, record 0, as the starting point from which to copy the operating system during system boot. The present invention understands that while this convention renders BIOS independent of particular operating systems, it restricts the loading of programs from disk during boot prior to loading the operating system, because the logical block addresses (LBAs) of the non-operating system programs are known only to the operating system and not to the BIOS.

As has become recognized, embedded or guest operating systems may need certain dynamic configuration data in order to sufficiently function, particularly at start-up. It is understood that storing configuration data (such as config files) should be away from where the data is to be used (i.e., separately), particularly as the real situation of modifying preference settings of programs where configuration is mutually stored may detrimentally impact the configuration data or setting of other programs. If the data is stored with the application program, or is otherwise centrally stored, a single point of failure possibility exists. Certain popular operating systems do not robustly separate their data resulting in effectively single points of failure for configuration data, where registry conflicts may readily cause setting information and configuration data for every program in the environment.

Additionally, though configuration data could be utilized through a file system on a HDD to store the information, given present commercial system configurations and non-standard inconsistencies, certain guest operating environments often lack the file system resource access or resource itself. Further the bootstrap application programs cannot simply be moved in their entirety to non-volatile BIOS memory, such as flash memory, primarily due to their size. Consequently, these applications must be booted from disk, yet need to be loaded prior to initiating a system boot.

As a result, it often proves a challenge to determine where the dynamic configuration data may be reliably situated. In certain situations, as is further set forth in FIG. 1A, a hypervisor, which as used herein is functionally a service provider of predetermined services to select operating systems in an operating environment, may logically reside above the hardware and below the operating systems in the operating environment. In certain other situations, a hypervisor may logically reside above a host operating system (HOS) residing above the hardware, and therefore virtualizes the hardware used by the one ore more lesser robust guest operating systems (GOS) residing above the hypervisor, as is exemplified in FIG. 1B.

Figure 1A:
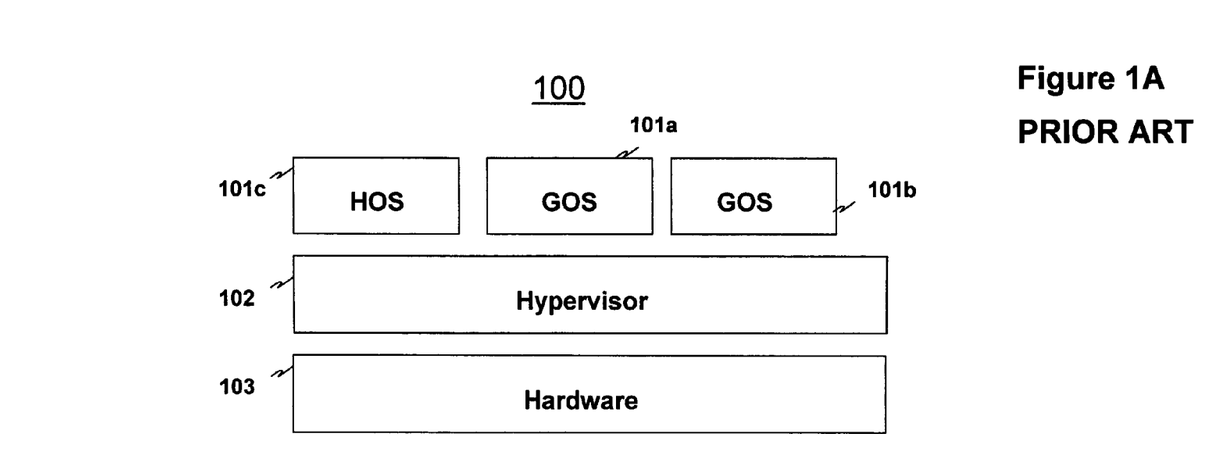
FIG. 1A is a logical depiction of a Type 1 hypervisor.
Figure 1B:
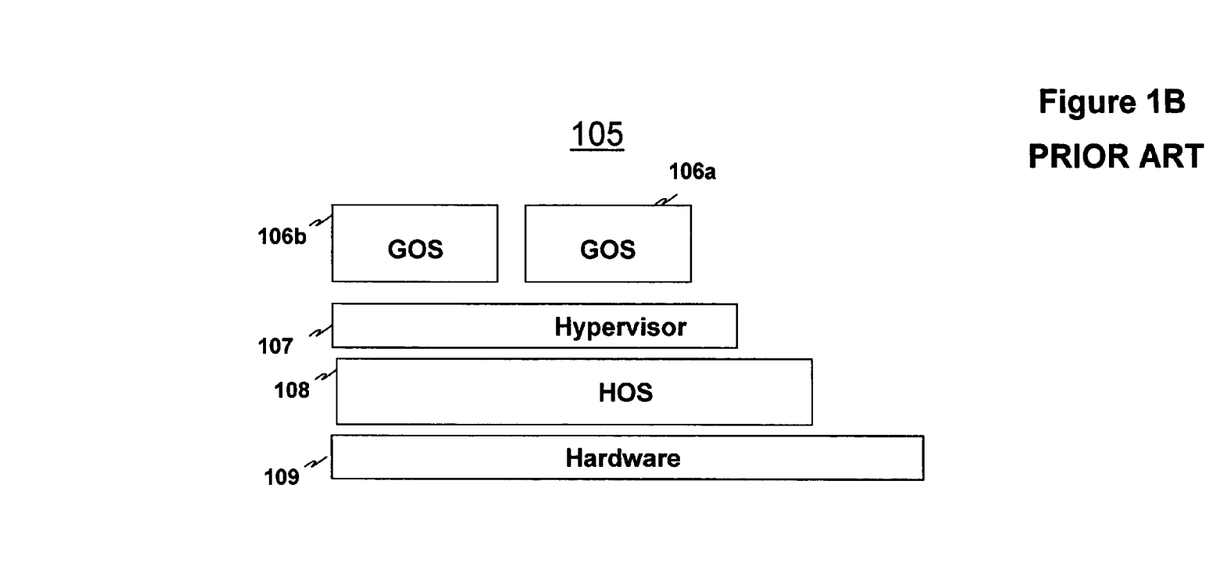
FIG. 1B is a logical depiction of a Type 2 hypervisor.

The hypervisor of FIG. 1A is referred to herein as a "Type 1 hypervisor" and the hypervisor of FIG. 1B is referred to herein as a "Type 2 hypervisor."

From FIG. 1A, a Type 1 hypervisor virtualization 100 includes a hypervisor 102 which typically resides directly above the hardware 103 and provide services for all the operating systems 101a, 101b, 101c. In this manner, of the operating systems, the HOS 101c is a special version of the GOS 101a, 101b and typically provides the device drivers for the hardware 103. The HOS 101c provides a means for the hypervisor 102 to provide virtualized devices for the remaining one or more GOS 101a, 101b. An example of a Type 1 hypervisor topology is the "Xen open source hypervisor." In a Type 1 hypervisor virtualization, the GOS may include service operating systems (SOS), secure operating systems (SeOS) and similar secondary operating systems that logically reside as a peer to the HOS. Typically a GOS should be closely linked and capable of communication with the HOS, and typically SeOS are a less robust GOS, typically devoid of a user interface and often having available only one or no more than a few basic services (e.g., filtering of the network interface). As used herein, a Type 1 hypervisor virtualization is intended to be inclusive of any hypervisor virtualization where the GOS, SOS, SeOS or similar employs one or more services thereof (e.g., filters the network interface) for the HOS.

From FIG. 1B, a Type 2 hypervisor virtualization 105 includes a hypervisor 107 which typically does not have direct hardware 109 access. The hypervisor 107 is above the HOS 108 and below the one or more GOS 106a, 106b. An example of a Type 2 hypervisor is Microsoft's Virtual PC as the hypervisor runs on top of a native WinXP® system installation. In this manner, the Type 2 hypervisor can in turn host other WinXP®, Linux, etc., systems. In a Type 2 hypervisor virtualization, the GOS may include service operating systems (SOS), secure operating systems (SeOS) and similar secondary operating systems that logically reside above a host operating system (HOS). Typically a GOS should be closely linked and capable of communication with the HOS, and typically SeOS are a less robust GOS, typically devoid of a user interface and often having available only one or no more than a few basic services (e.g., filtering of the network interface).

Where there is no modifying term preceding the use of the term "hypervisor," it is intended that the unmodified hypervisor term is of the Type 1 hypervisor.

Accordingly, what is needed is a system and method for loading programs during system boot using stored configuration data in a predetermined file system of a host operating system, prior to its operation, and providing the stored configuration data to one or more guest operating systems within the host operating environment, for its or their initialization.

SUMMARY OF THE INVENTION

The present invention fulfills these needs and has been developed in response to the present state of the art, and in particular, in response to the problems and needs in the art that have not yet been fully solved by currently available security protocols and technologies.

A method for loading programs during system boot using stored configuration data in a predetermined file system of a host operating system, from a prior operation, and providing the stored configuration data to one or more guest operating systems within the host operating environment prior to its or their operation, is provided.

An apparatus comprising a computer system configured for loading programs during system boot using stored configuration data in a predetermined file system of a host operating system, from a prior operation, and providing the stored configuration data to one or more guest operating systems within the host operating environment prior to its or their operation, is provided.

A computer system comprising at least one hard disk drive (HDD) containing at least one table of contents (TOC) including at least one image entry corresponding to a program on the HDD; at least one main solid state memory; at least one processor having access to a basic input/output system (BIOS) for booting programs from the HDD into the main solid state memory; at least one non-volatile solid state memory accessible to the BIOS, the non-volatile solid state memory including a pointer to the TOC; a logic accessing the TOC using the pointer; and logic accessing the program using the TOC to boot the program into the main solid state memory, wherein system is capable of: storing predetermined data of a plurality of application programs from a guest operating system (GOS) in a storage medium of a memory of a host operating system (HOS), wherein said HOS is in communication with said GOS; storing a redundant copy of said stored predetermined data at a predetermined area of available GOS memory of said GOS; initiating a boot sequence of computing environment having said GOS and HOS; and initializing said redundant copy of said stored predetermined data in GOS memory by providing said stored data in said memory of a file system of said HOS by executing a bootstrap loader; loading said predetermined data in said storage medium of said HOS at a location determined from said loader; identifying said memory space location to be utilized by said GOS; copying said predetermined data to said identified memory space location; obtaining said predetermined data by GOS accessing said predetermined data at said identified memory space location; and completing said initializing of said redundant copy of said predetermined data, is provided.

Further embodiments, forms, objects, features, advantages, aspects, and benefits of the present application shall become apparent from the detailed description and drawings included herein.

DETAILED DESCRIPTION

The present invention relates generally to loading programs during system boot from files resident in a host operating system into computer memory for use by one or more guest operating systems which are in communication with the host operating environment. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1C:
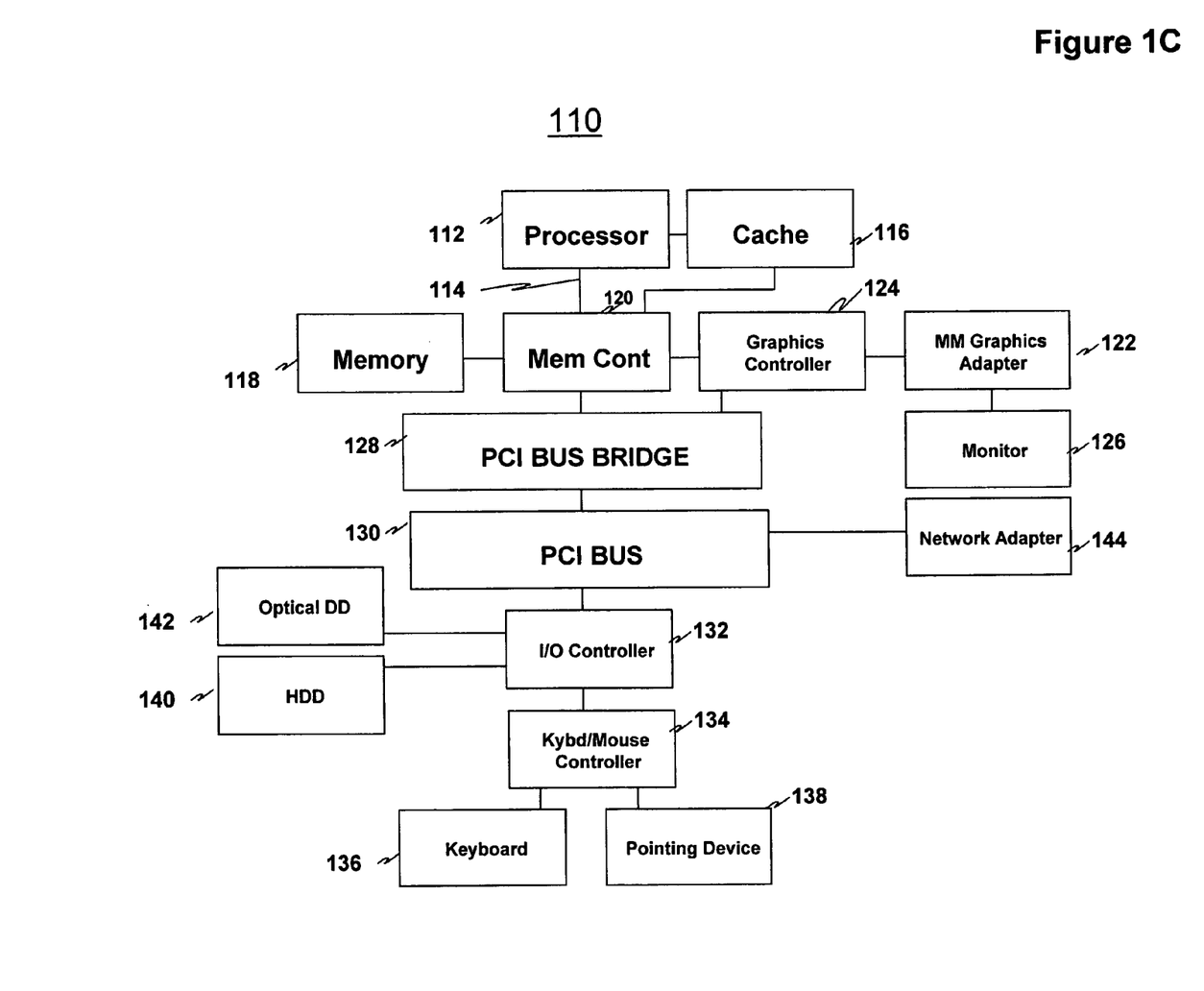
FIG. 1C depicts a block diagram of a non-limiting computer system that can use the present invention.

Referring initially to FIG. 1C, a high-level block diagram of a data processing system, generally designated 110, is shown in which the present invention may be implemented. The system 110 in one aspect is a personal computer or laptop computer.

The system 110 includes a processor 112 that is connected to a processor bus 114, and a cache 116 which is used to stage data to and from the processor 112 at reduced access latency. In non-limiting embodiments the processor 112 can access data from the cache 116 or from a system solid state memory 118 by way of a memory controller function 120. The cache 116 may include volatile memory such as DRAM and the memory 118 may include non-volatile memory such as flash memory. Also, the memory controller 120 is connected to a memory-mapped graphics adapter 122 by way of a graphic bus controller 124, and the graphics adapter 122 provides a connection for a monitor 126 on which the user interface of software executed within data processing system 110 is displayed.

The non-limiting memory controller 120 may also be connected to a personal computer interface (PCI) bus bridge 128, which provides an interface to a PCI bus 130. Connected to the PCI bus 130 may be an input/output (I/O) controller 132 for controlling various I/O devices, including, e.g., a keyboard/mouse adapter 134 which provides connection to a keyboard 136 and to a pointing device 38, which may be implemented by a mouse, trackball, or the like. Additionally, a hard disk drive 140 is connected to the I/O controller 132. If desired, an optical disk drive 142, such as a DVD or CD drive, can be connected to the I/O controller 132. In certain implementations a network adapter 144 can be attached to the PCI bus 130 as shown for connecting the data processing system 110 to a local area network (LAN), the Internet, or both. In any case, in accordance with principles known in the art, during power-on the processor 112 executes a basic input/output system (BIOS) program that may be stored in the memory 118, to load an operating system in the hard disk drive 140 into the memory 118.

In one embodiment of the present invention a method for loading programs during system boot using stored configuration data in a predetermined file system and providing the stored configuration data to a guest operating system, during start-up, within the host operating environment in a predetermined manner, is provided.

Figure 2:
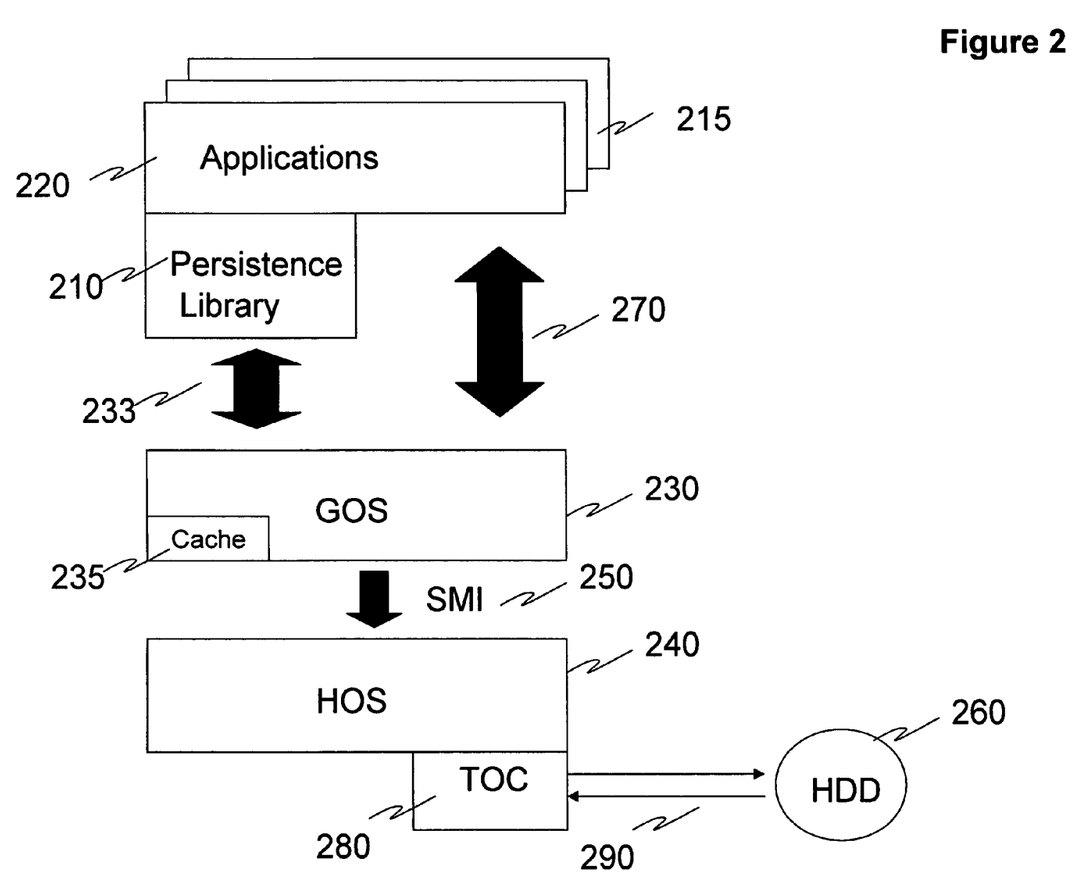
FIG. 2 depicts a relational block diagram of the system of the present invention including aspects of data storage activities.

FIG. 2 depicts a relational block diagram of the system of the present invention including aspects of data storage activities. From FIG. 2, the Persistence Library (210) is a library having persistent information (215) which is used by a guest operating system (GOS) (230). Persistent information (215) may include applications (220) used by the GOS (230) which may be routine or of heightened complexity given the needs of the GOS (230) and user. As used herein, the term "persistent information" is interchangeably used with the term "persistent data." Examples of these types of application may include power management functions or diagnostics which may or may not require service code isolated from the host operating system (HOS) (240) which preferably has a file structure, such that these types of applications could be instantiated and executed without the knowledge of the HOS (240). Similarly, the service code of the GOS (230) may also be a function of the BIOS and may also reside in a chipset, and preferably, the GOS is closely linked and capable of communication (at 270) with the HOS.

The GOS (230) may include or be a service such as that of GOS Service, which also maintains a copy (235) of the configuration data (215), which may be in cache (235). For example the GOS Service is able to transfer configuration data to other operating environments that have a file system structure, such as the HOS Service (240), which is also the HOS as used here, via a Shared Memory Interface (SMI) (250). This stored copy with the GOS (230) is also updated (at 233) where such updates are based upon changes to the configuration data which may occur based upon the operations of the applications (220). The GOS also provides security functionality to the configuration data which in part for verification purposes occurring during the initialization, and the HOS and GOS are capable of communication when each is operative. In a preferred embodiment, the HOS and GOS may communicate via a private shared memory channel or shared communication means. As used herein, the term "GOS" may be a GOS, SOS or SeOS.

From FIG. 2, the 230 function may be deemed as a GOS where the 240 function may be deemed a HOS. The HOS (240) also preferably stores configuration data in accordance with the present invention in a memory location, such as a HDD file (260), of the HOS (240), where the data's storage location thereon is determined using the TOC (280) of the referenced application ("TOC") and may be thereafter identified by the HOS (at 290).

From FIG. 2, the HOS is capable of interpreting the file system on the HDD in a preferred embodiment, though alternatively, raw sectors of the HDD may be read separately by pertinent code provided the code has access to the hardware, such that the data stored (i.e. persisted) and required by the GOS in a subsequent boot may be accessed.

Preferably, the stored configuration data is stored in a file system of an operating system apart from the GOS, wherein such operating system is a HOS. A GOS of the present invention is preferably closely linked and capable of communication with the HOS.

Figure 3:
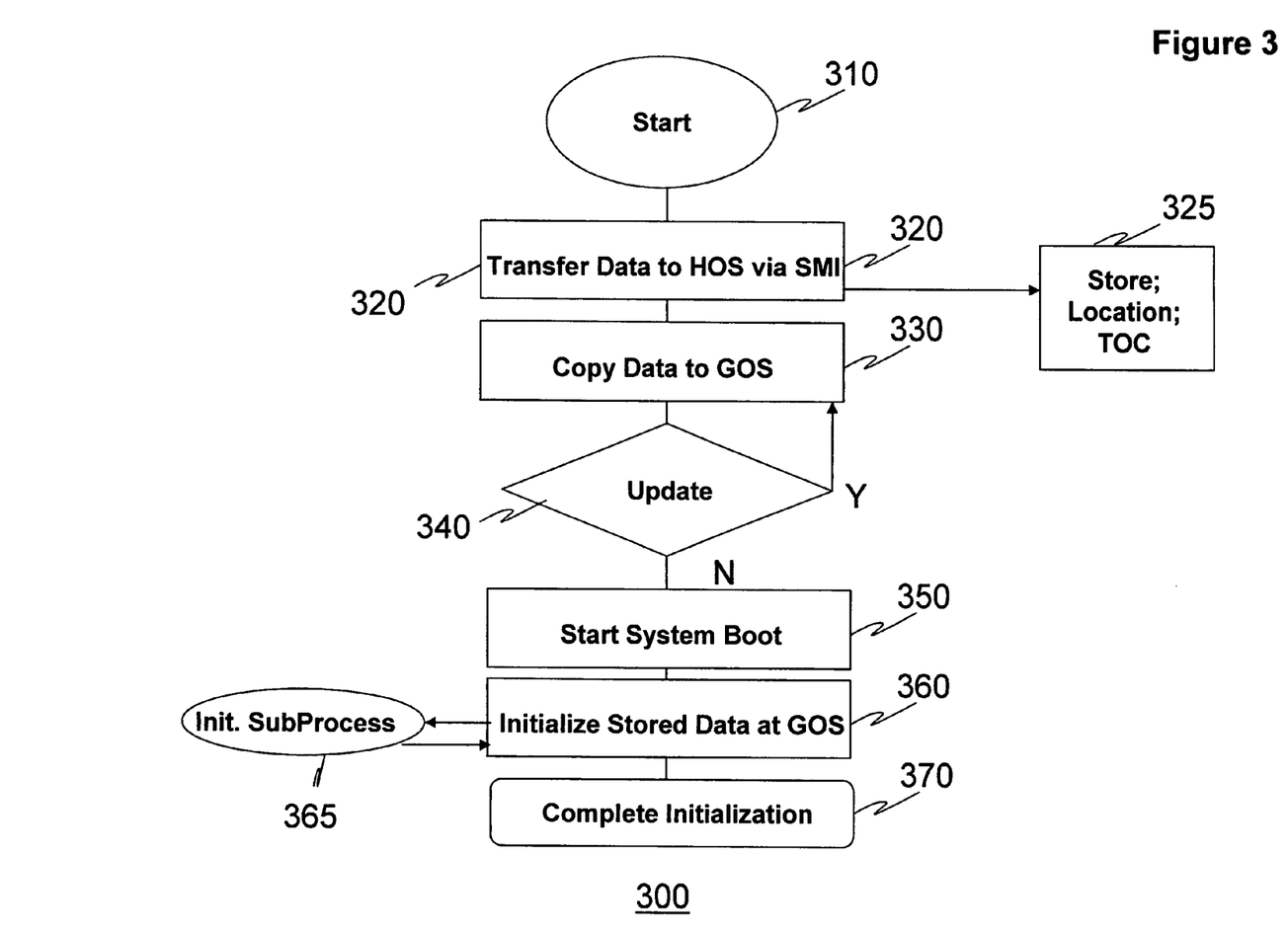
FIG. 3 is an operational flowchart of the present invention in accordance with an embodiment.

FIG. 3 is an operational flowchart of the present invention in accordance with an embodiment of the present invention. In FIG. 3, a method (300) for loading programs during system boot using stored configuration data in a predetermined file system of a HOS, obtained from a prior operation, and providing the stored configuration data to one or more GOS within the host operating environment, prior to its or their operation, is set forth.

From FIG. 3, a process begins (at 310) where configuration data is transferred by a SMI operation (at 320) to an operating environment that has a file system structure, such as the HOS. Preferably, the configuration data that is stored in the file system of the HOS is stored on a HDD file in the file system via an installation program such that it can be readily accessed by the HOS (at 325). The area in which the configuration is stored on the HDD is determined by the method of the referenced application ("HDD Location") and may be located by the HOS using the TOC of the referenced application ("TOC") (also at 325). The terms "HDD Location" and "TOC" are intended to be read inclusive of all referenced applications and not intended to be limited by physical structure or functional interpretations excluding said references.

A copy of the configuration data is also copied and stored to the GOS (at 330). This stored copy of configuration data with the GOS is subject to updating (at 340) if updates occur to changes to the configuration data which may occur based upon the operations of the application. The GOS generates and maintains in its main memory the copy of the configuration data stored in the file system of the HOS such that when modifications are made by the GOS to the configuration data, these modifications may be retained and updated in the stored file at the GOS main memory. After starting a system boot sequence (at 350), the stored copy of configuration data in the GOS is then initialized (at 360) in accordance with the present invention, where a defined subprocess or initialization sequence may occur (at 365) as further defined herein. Thereafter, the initialization may complete (at 370) as further defined hereinbelow.

In an alternative embodiment, the service code of the GOS may be part of the BIOS.

Figure 4:
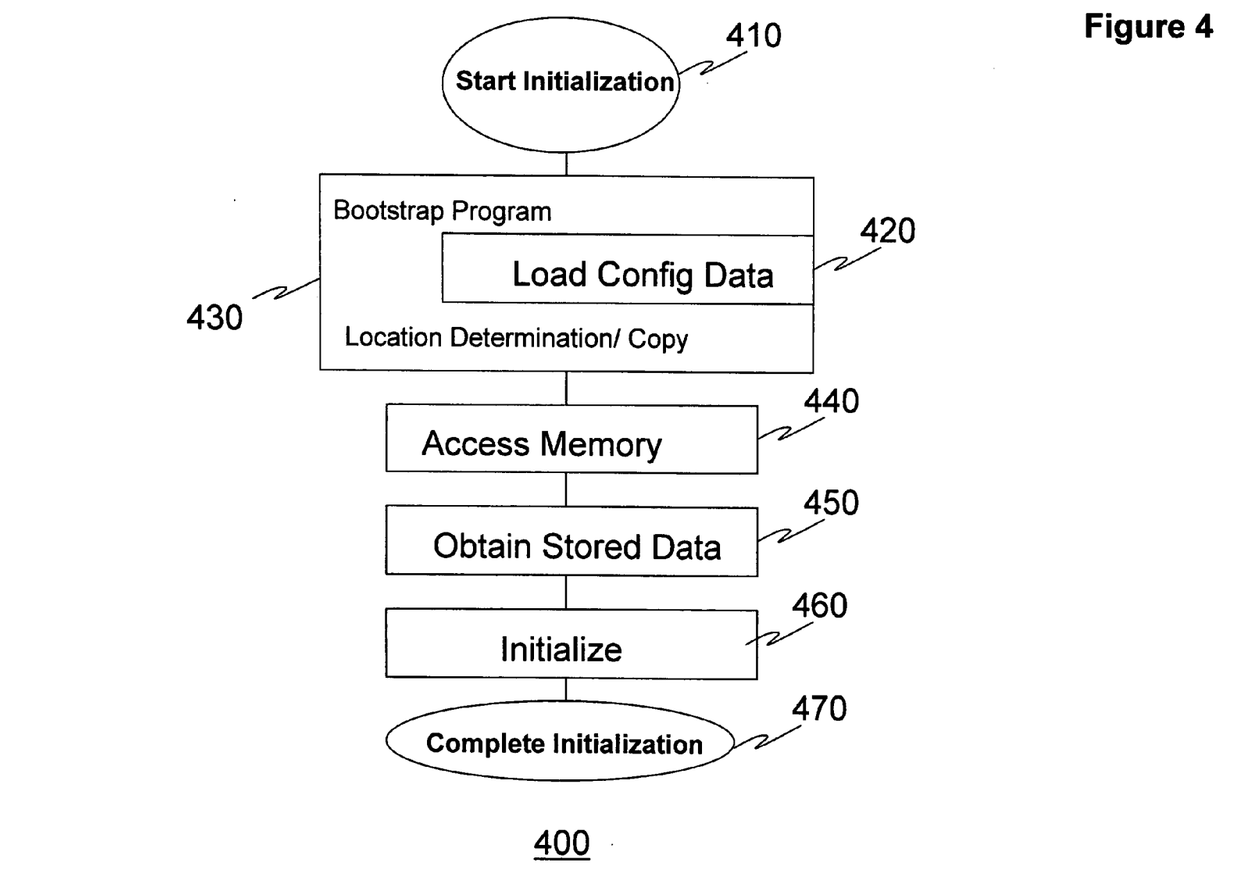
FIG. 4 is an operational flowchart of an initialization process in accordance with an aspect of an embodiment of the present invention.

FIG. 4 is an operational flowchart of an initialization process (e.g., 360 of FIG. 3) or subprocess (e.g., 365 if FIG. 3) (at 400) in accordance with an aspect of an embodiment of the present invention. The initialization of the stored copy occurs after starting the boot sequence and may occur in one of a number of aspects in accordance with the present invention, as is further defined below, wherein the flowchart and sequence of FIG. 4 is but one exemplar of one such aspect.

From FIG. 4, after starting the boot sequence (e.g., 350 of FIG. 3), the stored copy of configuration data in the GOS then begins initialization during system boot (at 410). In one aspect of the illustrative embodiment (400), the Enhanced Firmware Interface (EFI) loads the configuration data into the preload environment (PE) (i.e., the HOS environment) memory space (at 420). The EFI file system commands allow the creation, display and access of the EFI file system on a given device. The location of where the configuration data is to be stored in the memory is determined using a bootstrap loading program (at 430). The program identifies the memory location to be used by the GOS and then the configuration data is copied into the determined memory location. The determined memory location is preferably at an offset location that is predetermined. Under the present invention, the GOS is then able to access the memory at the determined memory location (i.e., at the offset) (at 440), obtain the stored configuration data (at 450), and then initialize the copy of the stored configuration data (at 460). Once initialization is complete, the initialization sequence ends (at 470).

In another aspect of the illustrative embodiment, a boot process application other than the bootstrap loading program is executed to provide the copying of the configuration in the above illustrative embodiment.

In another aspect of the illustrative embodiment, a hypervisor creates a shared memory area which links the configuration data that is copied to the memory where the persistence data has been located by the boot manager. The boot manager first places the persistence data in memory and then passes the address as a parameter to the virtual memory. The virtual memory then creates shared memory that is limited in availability only to the GOS. The GOS also obtains access to the same shared memory and reads the data. The GOS then continues with initialization as set forth in prior aspects.

In another aspect of the illustrative embodiment, the SMI provided by the BIOS tunnels the memory into the HOS using the steps of: 1) a boot manager copies persistence data into a block of memory; 2) the boot manager then calls the SMI to locate the persistence data; 3) the HOS boots and calls an SMI to start reading the memory, where the BIOS could read the data and place it into the System Management Memory (SMM) space during the pre-boot period, and thereafter any application would be able to obtain the data from the SMI interrupt handler by repeated SMIs. In this manner the data remains protected from corruption.

In another aspect of the illustrative embodiment, the virtual memory manager virtualizes a keyboard controller style (KCS) interface when an active management means (AMM), such as Active Management Technology (AMT) (reference Intel Corporation), is not present, wherein non-volatile random access memory (RAM) from AMM is utilized through the KCS interface.

In another aspect of the illustrative embodiment, a boot manager calls into existing shared memory Application Program Interfaces (APIs) to allocate a block. As used herein an API is a set of routines that an application uses to request and carry out lower-level services performed by a computer's operating system. In operation, this may be accomplished after the VMM and GOS have started, where a boot manager places configuration data in the shared memory and continues forward with the normal booting process. The GOS also obtains access to the same shared memory and reads the configuration data, thereby allowing the initialization to continue forward.

In another aspect of the present illustrative embodiment, the HOS gains access to all of a memory map and determines the storage location of the configuration data in the main memory. Once the location is determined, the configuration data may be copied into its own memory or image location. Once copied, a VMM may be informed and the HOS memory map is adjusted to map back to only it own memory space.

In an alternative aspect, the above illustrative embodiment may also be used an alternate approach to position the configuration data in the HOS memory space.

The term SMI is not intended to be limited to the only ability to transfer data to another operating environment. For the avoidance of doubt, functional equivalents capable of performing the necessary functionality set forth herein are readily envisioned in the present invention.

Many other embodiments of the present invention are also envisioned. For example, in other embodiments, the present invention is directly applicable for Windows-based and Unix-based computing systems.

As used herein, terms such as personal computers, PCs, systems, and similar terms are intended to be used interchangeably, without distinction or limitation. Such systems may include but not be limited to servers, server-based systems, multi-chipset systems, touch sensitive systems, assemblies and devices therein, etc.

As used herein, the terms "remote", "peripheral", "device", and the like are intended to be used interchangeably but are not intended to be singular or necessarily specific to a particular connection technology such as being hardwired or wireless, but rather such terms are used with the understanding that the terms of interest are in or capable of being in operative communication with a system of the present invention.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method comprising:
    storing predetermined data of one or more application programs from a guest operating system (GOS) in memory accessible by a host operating system (HOS) via a file system of the HOS and accessible by a BIOS, wherein the HOS and GOS are operational, and wherein the HOS and GOS are capable of communication with one another;
    storing a redundant copy of the stored predetermined data by the HOS at a predetermined area of available memory;
    updating the redundant copy when changes to the stored predetermined data of one or more application programs from the GOS occurs;
    initiating by the HOS accessing the memory prior to the GOS and HOS being operational, in a subsequent boot sequence, a computing environment having the GOS and HOS; and
    initializing the redundant copy of the stored predetermined data in memory by providing the stored predetermined data in the memory accessible by the HOS via the file system of the HOS, thereby completing the boot sequence of the computing environment.

2. The method of claim 1 wherein the memory of the file system of the HOS includes a storage medium.

3. The method of claim 2 wherein initializing the redundant copy of the stored predetermined data in GOS memory further comprises:
    executing a firmware interface loader;

loading the predetermined data in the memory of the file system of the HOS into a preload environment memory space at a location determined from the loader;

identifying the memory space location to be utilized by the GOS;

copying the predetermined data to the identified memory space location;

obtaining the predetermined data by GOS accessing the predetermined data at the identified memory space location;

and completing the initializing of the redundant copy of the predetermined data.

4. The method of claim 3 wherein the identified memory space location is at a predetermined offset location and is identified using a table of contents (TOC).

5. The method of claim 3 wherein the loader is bootstrap loading program.

6. The method of claim 5 wherein the bootstrap loading program is a boot process application other than the bootstrap loading program.

7. The method of claim 6 wherein code of GOS includes a portion of the BIOS.

8. The method of claim 4 wherein the data is one of configuration data, persistent data from a persistence library or application data, and the storage medium is a physical drive.

9. The method of claim 8 wherein the data is one of configuration data, persistent data from a persistence library or application data, and the storage medium is a memory drive.

10. The method of claim 9 wherein code of GOS includes a portion of the BIOS.

11. The method of claim 2 wherein initializing the redundant copy of the stored predetermined data in GOS memory further comprises creating a shared memory area linking the stored predetermined data in the memory of the file system of the HOS to the GOS memory.

12. The method of claim 11 further comprising a Type 1 hypervisor for creating the shared memory area.

13. The method of claim 2 wherein initializing the redundant copy of the stored predetermined data in GOS memory further comprises:

placing the predetermined data in the memory of the HOS via a boot manager;

passing an address location to a virtual memory; creating shared memory between the HOS and the GOS using the virtual memory;

limiting availability of the shared memory only to the GOS;

GOS accessing the shared memory; and

GOS reading the predetermined data.

14. The method of claim 2 wherein initializing the redundant copy of the stored predetermined data in GOS memory further comprises providing SMI from the BIOS; and tunneling into the HOS memory.

15. The method claim 14 wherein tunneling into the HOS memory includes:

copying the predetermined data by a boot manager into a block of the HOS memory;

the boot manager calling the SMI to locate the predetermined data;

booting by the HOS; and calling the SMI to read the HOS memory.

16. The method of claim 2 wherein initializing the redundant copy of the stored predetermined data in GOS memory further comprises having a boot manager call into shared memory Application Program Interfaces (APIs) to allocate a block.

17. The method of claim 16, wherein the boot manager calling includes:

starting VMM and GOS; having the boot manager locate the predetermined data in a shared memory;

permitting said GOS to access the shared memory; and enabling GOS to read the predetermined data.

18. The method of claim 2 wherein initializing the redundant copy of the stored predetermined data in GOS memory further comprises:

providing HOS access to a memory map defining all memory locations; and determining a location of the predetermined data in the memory map.

19. The method of claim 18 further comprising copying the predetermined data into GOS memory and reverting the HOS memory map to map its original memory space.

20. A method comprising:

storing predetermined data of one or more application programs from a guest operating systems (GOS) in memory accessible by a host operating system (HOS) via a file system of the HOS and accessible by the BIOS, wherein the HOS and GOS are operational, and wherein the HOS and GOS are capable of communication with one another;

storing a redundant copy of the stored predetermined data by the HOS at a predetermined area of available memory;

updating the redundant copy when changes to the stored predetermined data of one or more application programs from the GOS occurs;

shutting down said computing environment;

subsequently re-starting said computing environment by initiating a boot;

initializing the redundant copy of the stored predetermined data in memory by providing the stored predetermined data in the memory accessible by the HOS via the file system of the HOS, thereby completing the boot sequence of the computing environment;

loading the predetermined data in the storage medium of the HOS at a location determined from the loader;

identifying the memory space location to be utilized by the GOS;

copying the predetermined data to the identified memory space location; and obtaining the predetermined data by GOS accessing the predetermined data at the identified memory space location; and completing the initializing of the redundant copy of the predetermined data, wherein the identified memory space location is at a predetermined offset location and is identified using a table of contents (TOC).

21. A computer system comprising:

a processor connected to a processor bus;

a cache used to stage data to and from the processor;

a memory controller function;

a memory-mapped graphics adapter; and a graphic bus controller, wherein the computer system is capable of storing predetermined data of one or more application programs from a guest operating system (GOS) in memory accessible by a host operating system (HOS) via a file system of the HOS and accessible by a BIOS wherein the HOS and GOS are operational and wherein the HOS and GOS are capable of communication with one another; storing a redundant copy of the stored predetermined data by the HOS at a predetermined area of available memory; updating the redundant copy when changes to the stored predetermined data of one or more application programs from the GOS occurs; initiating by the HOS accessing the memory prior to the GOS and HOS being operational, in a subsequent boot sequence, a computing environment having the GOS and HOS; initializing the redundant copy of the stored predetermined data memory by providing the stored predetermined data in the memory accessible by the HOS via the file system of the HOS, thereby completing the boot sequence of the computing environment; loading the stored predetermined data in a storage medium of the HOS at a location determined from the loader; identifying a memory space location to be utilized by the GOS; copying the stored predetermined data to the identified memory space location; obtaining the stored predetermined data by GOS accessing the stored predetermined data at the identified memory space location; and completing the start up sequence by completing initializing of the redundant copy of the stored predetermined data.

22. The computer system of claim 21 wherein the identified memory space location is at a predetermined offset location and is identified using a table of contents (TOC).

23. A computer system comprising:
at least one hard disk drive (HDD) containing:
at least one table of contents (TOC) including at least one image entry corresponding to a program on the HDD;
at least one main solid state memory;
at least one processor having access to a basic input/output system (BIOS) for booting programs from the HDD into the main solid state memory;
at least one non-volatile solid state memory accessible to the BIOS, the non-volatile solid state memory including a pointer to the TOC;
a logic accessing the TOC using the pointer; and logic accessing the program using the TOC to boot the program into the main solid state memory, wherein system is capable of:
storing predetermined data of one or more application programs from a guest operating system (GOS) in memory accessible by a host operating system (HOS) via a file system of the HOS and accessible by a BIOS, wherein the HOS and GOS are operational, and wherein the HOS and GOS are capable of communication with one another;
storing a redundant copy of the stored predetermined data by the HOS at a predetermined area of available memory;
updating the redundant copy when changes to the stored predetermined data of one or more application programs from the GOS occurs;
initiating by the HOS accessing the memory prior to the GOS and HOS being operational, in a subsequent boot sequence, of a computing environment having the GOS and HOS; and
initializing the redundant copy of the stored predetermined data in memory by providing the stored predetermined data in the memory accessible by the HOS via the file system of the HOS, thereby completing the boot sequence of the computing environment;
loading the stored predetermined data in a storage medium of the HOS at a location determined from the loader;
identifying a memory space location to be utilized by the GOS;
copying the stored predetermined data to the identified memory space location;
obtaining the stored predetermined data by GOS accessing the stored predetermined data at the identified memory space location; and
completing the start up of the computing environment by completing initializing of the redundant copy of the stored predetermined data.

24. The computer system of claim 23 wherein the identified memory space location is at a predetermined offset location and is identified using a table of contents (TOC) and the computing environment further includes a Type 1 hypervisor.

25. A method comprising:
storing predetermined data of one or more application programs from a guest operating system (GOS) in memory accessible by a host operating system (HOS) via a file system of the HOS and accessible by a BIOS, wherein the HOS and GOS are operational, and wherein the HOS and GOS are capable of communication with one another;
storing a redundant copy of the stored predetermined data by the HOS at a predetermined area of available memory;
updating the redundant copy when changes to the stored predetermined data of one or more application programs from the GOS occurs;
shutting down said GOS and said HOS;
initiating a subsequent boot sequence of computing environment having the GOS and HOS;
executing an initializing means for the redundant copy of the stored predetermined data in GOS memory means by providing the stored predetermined data in the memory means of the host system by executing a bootstrap loader means;
loading the stored predetermined data in the memory at a location determined from the loader means;
identifying the memory space location to be utilized by the GOS;
copying the predetermined data to the identified memory space location;
obtaining the stored predetermined data by GOS accessing the stored predetermined data at the identified memory space location; and
completing said start-up of said computing environment by completing the initializing means, wherein the identified memory space location is at a predetermined offset location and is identified using a table of contents (TOC).

26. A computer program product stored on a non-transitory computer usable medium comprising:
computer readable program means for causing a computer to control an execution of an application; the computer program product including program instructions for:
causing the computer to implement a commit procedure;
causing the computer to store predetermined data of one or more application programs from a guest operating system (GOS) in memory of a file system of a host operating system (HOS) accessible by a BIOS when said GOS and HOS are operational, wherein said HOS and GOS are capable of communication with one another, and said HOS and GOS are within an operational computing environment;
storing a redundant copy of the stored predetermined data by the HOS at a predetermined area of available memory;
updating the redundant copy when changes to the stored predetermined data of one or more application programs from the GOS occurs;
shutting down said computing environment;
restarting said computing environment by initiating by the HOS accessing the memory prior to the GOS and HOS being operational, in a subsequent boot sequence a computing environment having the GOS and the HOS;

initializing the redundant copy of the stored predetermined data in memory by providing the stored predetermined data in the memory accessible by the HOS via the file system of the HOS;

causing the computer to resynchronize the incomplete commit procedure asynchronously relative to the application; and causing said computing environment to return to an operational setting.

27. The computer program product of claim 26 further comprising:

initializing the redundant copy of the stored predetermined data in memory by providing the stored data in the memory accessible by the HOS via the file system of the HOS, thereby completing the boot sequence of computing environment;

loading the predetermined data in the memory of the file system of the HOS into a preload environment memory space at a location determined from the loader;

identifying the memory space location to be utilized by the GOS;

copying the predetermined data to the identified memory space location;

obtaining the predetermined data by GOS accessing the predetermined data at the identified memory space location; and completing the initializing of the redundant copy of the predetermined data.

28. The computer program product of claim 27 wherein the identified memory space location is at a predetermined offset location and is identified using a table of contents (TOC); the loader is bootstrap loading program; and code of GOS includes a portion of the BIOS.

29. A computer system comprising:

at least one hard disk drive (HDD) containing:

at least one table of contents (TOC) including at least one image entry corresponding to a program on a storage medium (SM);

at least one main solid state memory;

at least one processor having access to a basic input/output system (BIOS) for booting programs from the SM into the main solid state memory;

at least one non-volatile solid state memory accessible to the BIOS, the non-volatile solid state memory including a pointer to the TOC;

a logic accessing the TOC using the pointer; and logic accessing the program using the TOC to boot the program into the main solid state memory, wherein system is capable of:

storing predetermined data of one or more application programs from a guest operating system (GOS) in memory accessible by a host operating system (HOS) via a file system of the HOS and accessible by a BIOS, wherein the HOS and GOS are operational, and wherein the HOS and GOS are capable of communication with one another;

storing a redundant copy of the stored predetermined data by the HOS at a predetermined area of available memory;

updating the redundant copy when changes to the stored predetermined data of one or more application programs from the GOS occurs;

shutting down said computing environment such that said one or more GOS and said HOS are not operational;

restarting said computing environment by:

initiating by the HOS accessing memory prior to GOS and HOS being operational, a subsequent boot sequence of said computing environment for operation of said one or more GOS and said HOS;

initializing the redundant copy of the stored predetermined data in GOS memory by providing the stored predetermined data in SM of the HOS by executing a bootstrap loader;

loading the predetermined data in the SM of the HOS at a location determined from the loader;

identifying the memory space location to be utilized by the GOS;

copying the predetermined data to the identified memory space location;

obtaining the predetermined data by GOS accessing the predetermined data at the identified memory space location; and completing the start up of the computing environment by completing initializing of the redundant copy of the predetermined data.

30. The system of claim 29 wherein said predetermined data is configuration data.

31. The system of claim 29 including a plurality of GOS in communication with said HOS by a shared channel means.

32. The system of claim 29 wherein said further including a hypervisor logically situated above said hardware and below said one or more GOS and HOS.

33. The system of claim 32 wherein said hypervisor is a Type 1 Xen open source hypervisor.

* * * * *